US007624826B2

(12) United States Patent
Zhao

(10) Patent No.: US 7,624,826 B2
(45) Date of Patent: Dec. 1, 2009

(54) PORTABLE POWER-SAVING AND FOLDABLE ELECTRIC WHEEL CHAIR

(76) Inventor: Tianyun Zhao, No. 5 Building 71 of Yangfangdian Block, Haidian District, Beijing (CN) 100038

( * ) Notice: Subject to any disclaimer, the term of this patent is extended or adjusted under 35 U.S.C. 154(b) by 91 days.

(21) Appl. No.: 11/421,487

(22) Filed: Jun. 1, 2006

(65) Prior Publication Data

US 2007/0040349 A1 Feb. 22, 2007

(30) Foreign Application Priority Data

Jul. 8, 2005 (CN) .................... 2005 2 0112370 U
Sep. 28, 2005 (CN) ........................ 2005 1 0105447

(51) Int. Cl.
*B62D 11/00* (2006.01)

(52) U.S. Cl. ........................ 180/6.5; 180/6.48; 180/907

(58) Field of Classification Search .................. 180/6.5, 180/6.48, 907
See application file for complete search history.

(56) References Cited

U.S. PATENT DOCUMENTS 2,798,565 A * 7/1957 Rosenthal et al. ............ 180/6.5
3,064,744 A * 11/1962 Jennings ..................... 180/6.5
3,100,860 A * 8/1963 Rosenthal .................... 318/55
3,376,944 A * 4/1968 Lotz ........................... 180/6.5
3,901,337 A * 8/1975 Cragg ........................ 180/6.5
4,634,941 A * 1/1987 Klimo ........................ 318/139
4,823,900 A * 4/1989 Farnam ...................... 180/6.5
4,953,645 A * 9/1990 Korber et al. ................ 180/6.5
5,022,476 A * 6/1991 Weege ........................ 180/6.5
5,094,310 A * 3/1992 Richey et al. .............. 180/65.6
5,137,102 A * 8/1992 Houston et al. ............ 180/65.5
5,366,037 A * 11/1994 Richey ...................... 180/65.5
5,540,297 A * 7/1996 Meier ........................ 180/65.5

(Continued)

*Primary Examiner*—Lesley D Morris
*Assistant Examiner*—Maurice Williams
(74) *Attorney, Agent, or Firm*—Kile Goekjian Reed & McManus PLLC

(57) ABSTRACT

The present invention relates to a kind of portable power-saving and foldable electric wheel chair, characterized in that there is a hand control direction device on the left elbow 10 to control the specific running direction of the electric wheel chair; the left and right rear wheels 3 are integrated with the motors 30 respectively, so as the two motors 30 can directly drive the two rear wheels; two disc brakes 20 are installed on the left and right rear wheels 3, the two disc brakes are connected to the brake handle 15 via the main steel string 24, by means of a single hand press brake handle 15, the two rear wheels 3 braked simultaneously; switches 18 for positive or inversion running control the main running direction of electric wheel chair; an intellectual control rod may also be installed on the right elbow 12 to replace the speed-adjusting turning handle 14 and switches 18 for positive or inversion running. It is also characterized mainly in that: the worm-gearing indirect driving and electric magnetic brakes used by normal electric wheel chairs are not used by the present invention, so significant power-saving is achieved; and there is a cross foldable device 1.41-1.48 in the vehicle frame 1. Compared with the normal electric wheel chair, the advantages of the invention are: the self-weight is only half of the formers, the power consumption is only less than half of the formers, the traveling distance is twice of the formers, the comparable price (all are using lead-acid battery) is as low as a quarter of the formers, and foldable than the formers (with batteries).

2 Claims, 6 Drawing Sheets

U.S. PATENT DOCUMENTS 5,605,345 A * 2/1997 Erfurth et al. ............ 280/250.1
5,799,258 A * 8/1998 Fidanza et al. ................. 701/1
5,927,414 A * 7/1999 Kan et al. .................. 180/19.3
6,302,226 B1 * 10/2001 Kanno et al. ................. 180/6.5
6,354,390 B1 * 3/2002 Uchiyama et al. .......... 180/65.1
6,378,883 B1 * 4/2002 Epstein .................... 280/250.1
6,840,340 B2 * 1/2005 Inoue et al. ................ 180/19.3
7,083,019 B2 * 8/2006 Chiou et al. ............... 180/65.1
7,316,298 B2 * 1/2008 Yeager ....................... 188/2 F
2006/0103338 A1 * 5/2006 Takeuchi .................... 318/599

* cited by examiner

PORTABLE POWER-SAVING AND FOLDABLE ELECTRIC WHEEL CHAIR

BACKGROUND OF THE INVENTION

The present invention relates to the technical field of specific vehicles for senior folks and disabled persons, it is a kind of electric wheel chair.

Currently, the electric wheel chairs on the international market mainly come from outside mainland China, such as the United States, New Zealand, Taiwan (the area reflects the miniature of international market), and etc. Some are assembled and imitated in Shanghai. They have the advantage of intellectual control rod. However, most of them are bulky, the weights of entire chairs are from 60 kg to 120 kg, and they are not foldable and high power consumption. Besides, their running distance is too short. The main problem is that the design unilaterally pursues self-lock function to play a role at any moment. Consequently, a large amount of energy provides virtual power. The motor drives rear wheel indirectly by means of the self-locked worm-gearing system, and the intellectual control rod always monitors and controls the operation of vehicle. The two kinds of self-lock function make the electric wheel chair to be always under the status of ready for braking once it starts, so that it cannot realize to slip by power off. The high power consumption of worm-gearing and electric magnetic brake plus 20 kg to 30 kg of weight of lead-acid battery increases the weight and power consumption of the whole vehicle.

BRIEF SUMMARY OF THE INVENTION

The present invention provides a kind of portable power-saving and foldable electric wheel chair comprising a frame of wheel chair, two vertical pipes, two horizontally supporting pipes, two main vertical pipes, two rear wheels, a front direction wheel, a front caster, a left and a right arm-rest pipes, two arm-rests, wherein the front ends of the left and right arm-rest pipes are bent as elbows, a speed-adjust turning handle (or an intellectual control rod) and a hand press brake handle are installed on the right elbow, a hand control direction device is installed on the left elbow, there is a fixing plate between the left elbow and the vertical pipe, a hollow bearing is welded on the fixing plate, there is a vertical hand control rod inserting through the hollow bearing, the upper end of the vertical hand control rod is connected to a hand control direction handle, the lower end of the rod is connected to the vertical shaft of the front direction wheel, to hold the hand control direction handle by left hand, that is, to control the front direction wheel can accurately adjust and control the specific running direction of the electric wheel chair;

There are two mounting vertical boards for the rear wheels at the lower end of the left and right main vertical pipes respectively, the rear wheels with direct driving motors are secured on the vertical boards by bolts and nuts, the said motors are DC and brushless motors with stepless adjustable speed, low rotation speed, and high torque, the housings of the motors are integrated with the steel wheel plates of the rear wheels, so as the left and right motors can directly drive the two rear wheels by turning the speed-adjust turning handle (or by switching the intellectual control rod), the shortcoming of high power-consumption due to the indirect driving through the worm-gearings is overcome by means of the two motors directly driving the two rear wheels;

In addition, a disc brake device is established, the disc brake device is composed of a disc brake, a hand press brake handle, a main steel string, two branch strings, a delta-shaped conversion plate, and a connecting plate, the disc brake includes a disc brake sheet, a brake clamp and a brake rod, the disc brake is installed by the side of the motor by means of tightly screwing the female screw of the disc brake sheet in the male screw on the end-cover of the motor, the brake clamp and the brake rod are fixed on the vertical board via the connecting plate, the hand press brake handle is installed on the right elbow, one end of the main steel string is connected to the brake handle, another end is connected to the upper end of the delta-shaped conversion plate, one end of each of the left and right branch steel strings is connected to the left and right lower ends of the delta-shaped conversion plate respectively, another end is connected to the brake rods of the disc brakes of the left and right rear wheels respectively, in this way it attains the safe effect of the two rear wheels braking simultaneously by means of a single hand to press brake handle (or by means of a small electric device to draw the main steel string), as well as overcomes the shortcoming of high power consumption of electric magnetic brake;

There is also a cross foldable device in the wheel chair frame of the present portable power-saving and foldable electric wheel chair so that the chair is foldable (see the section of Description of Specific Embodiments, for details).

The present portable power-saving and foldable electric wheel chair is light (the total weight including lithium ion batteries is only 29 Kg), foldable with batteries, convenient to go upstairs and enter rooms or to be put into the baggage cabinets of cars, of very power-saving, able to run a long distance, good at climbing slopes, its speed is selectable from 7 km/h to 12 km/h, and it is convenient for disabled persons and senior folks to use.

DETAILED DESCRIPTION OF THE INVENTION

Figure 1:
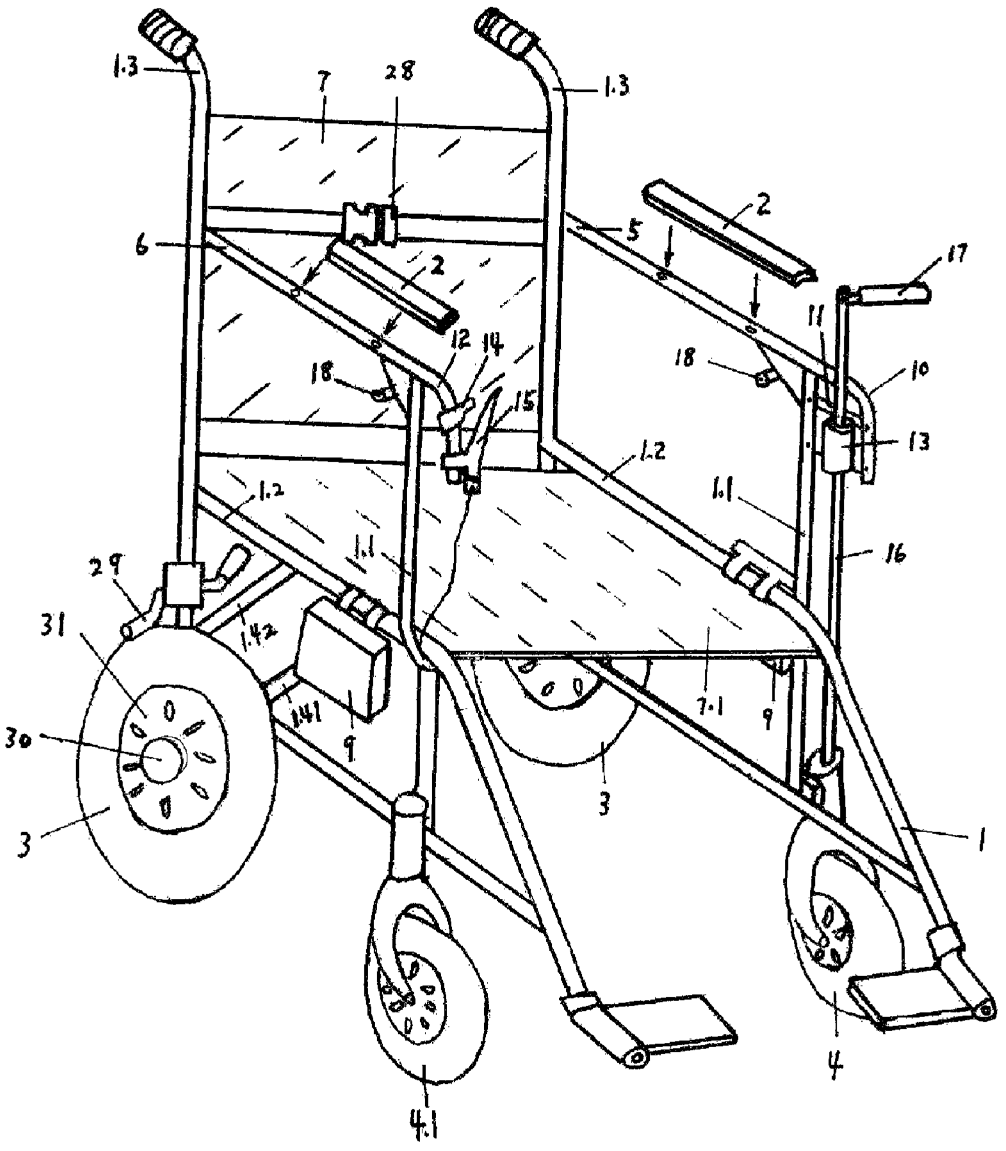
FIG. 1 shows the first schematic drawing of the configuration of the portable power-saving and foldable electric wheel chair.
Figure 2:
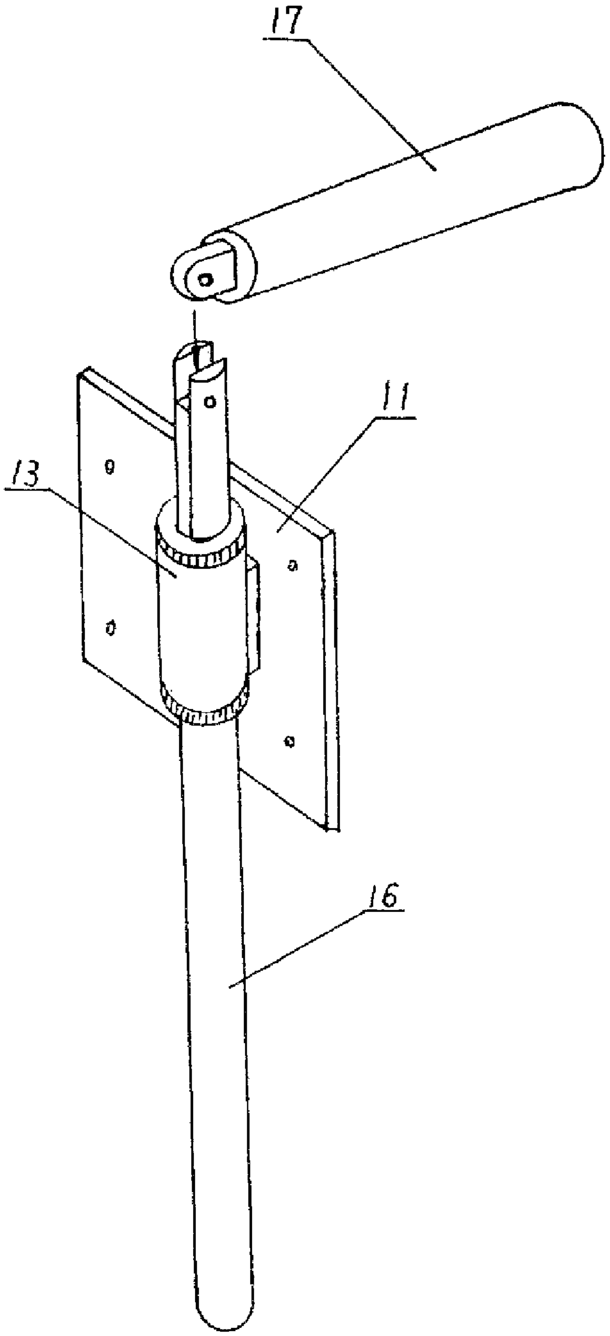
FIG. 2 shows the schematic drawing of the composition of hand control direction device.

The present invention provides a kind of portable power-saving and foldable electric wheel chair comprising a frame of wheel chair 1 (see FIG. 1), two vertical pipes 1.1, two horizontally supporting pipes 1.2, two main vertical pipes 1.3, two rear wheels 3, a front direction wheel 4, a front caster 4.1, a left arm-rest pipe 5, a right arm-rest pipe 6 and two arm-rests 2, wherein the front ends of the left and right arm-rest pipes 5 and 6 are bent as elbows, a speed-adjust turning handle 14 and a hand press brake handle 15 are installed on the right elbow 12, there is a fixing plate 11 between the left elbow 10 and the vertical pipe 1.1, a hollow bearing 13 is welded on the fixing plate 11, in addition, there is a vertical hand control rod 16 inserting through the hollow bearing 13, the upper end of the vertical hand control rod is connected to the hand control direction handle 17, the lower end of the rod is connected to the front direction wheel 4, in order to control the specific running direction of the electric wheel chair; (see FIGS. 2 & 1)

Figure 3:
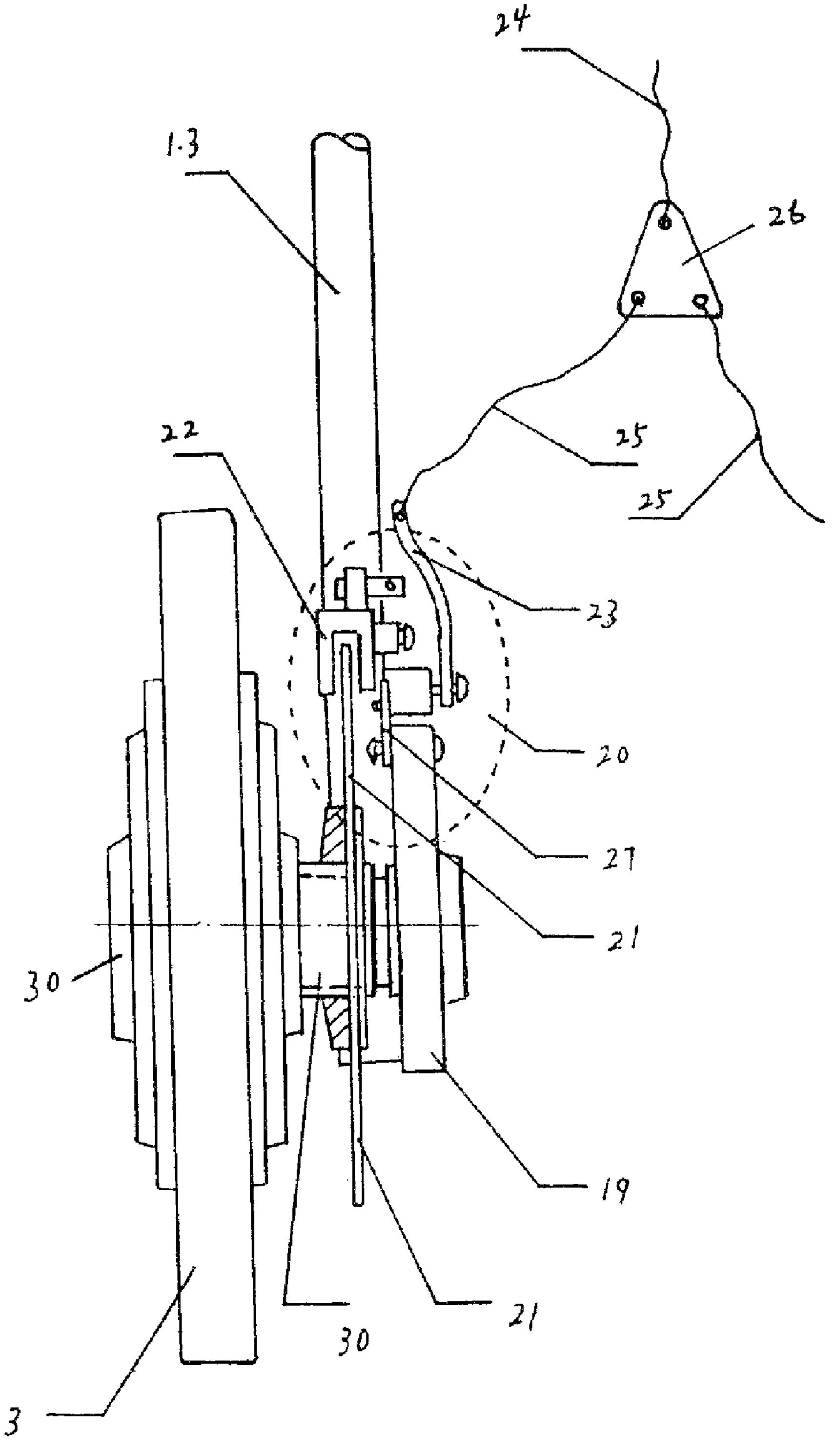
FIG. 3 shows the schematic drawing of the installation positions of the rear wheel directly driving motors and the disc brakes.

There are two mounting vertical boards 19 (see FIGS. 3 & 1) for the rear wheels at the lower end of the left and right main vertical pipes 1.3 respectively, the rear wheels 3 with direct driving motors 30 are secured on the vertical boards 19 by bolts and nuts, the said motors 30 are DC and brushless motors with stepless adjustable speed, low rotation speed, and high torque, the housings of the motors 30 are integrated with the steel wheel plates 31, so as the two motors 30 can directly drive the two rear wheels 3 to go forward and backward or to turn left and right in situ by means of switching two switches 18 and turning the speed-adjust turning handle 14 (or by means of only switching the intellectual control rod 32);

There are two lithium ion battery cases 9 for the two motors 30, the two cases are hung up from the left and right horizontally supporting pipes 1.2, to simplify the frame structure and to be convenient for hanging and unhanging batteries (with nickel-hydrogen batteries or with small capacity of lead-acid batteries to replace the lithium ion batteries, the battery cases are hung up from the supporting pipes 1.2 in the same way);

In addition, a disc brake device is established (see FIGS. 3 & 1), the disc brake device is composed of two disc brakes 20, a hand press brake handle 15, a main steel string 24, two branch strings 25, a delta-shaped conversion plate 26, and a connecting plate 27, the disc brake includes a disc brake sheet 21, a brake clamps 22 and a brake rod 23, the disc brake 20 is installed by the side of the motor 30 by means of tightly screwing the female screw of the disc brake sheet 21 in the male screw on the end-cover of the motor 30, the brake clamps 22 and the brake rods 23 are fixed on the vertical boards 19 via the connecting plates 27, the hand press brake handle 15 is installed on the right elbow 12, one end of the main steel string 24 is connected to the brake handle 15, another end is connected to the upper end of the delta-shaped conversion plate 26, one end of each of the left and right branch steel strings 25 is connected to the left and right lower ends of the delta-shaped conversion plate 26 respectively, another end is connected to the brake rods 23 of disc brakes 20 of the left and right rear wheels respectively, in this way the two rear wheels braked simultaneously by means of a single hand to press brake handle (or by means of a small electric device to draw the main steel string 24).

Figure 4:
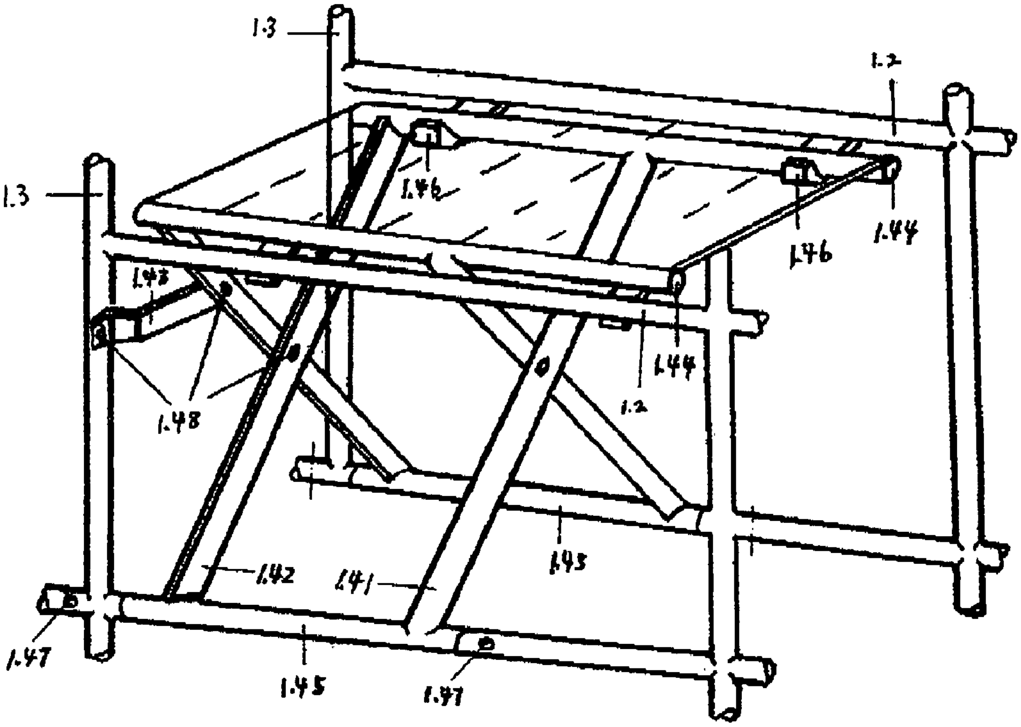
FIG. 4 shows the schematic drawing of the cross foldable device of the portable power-saving and foldable electric wheel chair.
Figure 5:
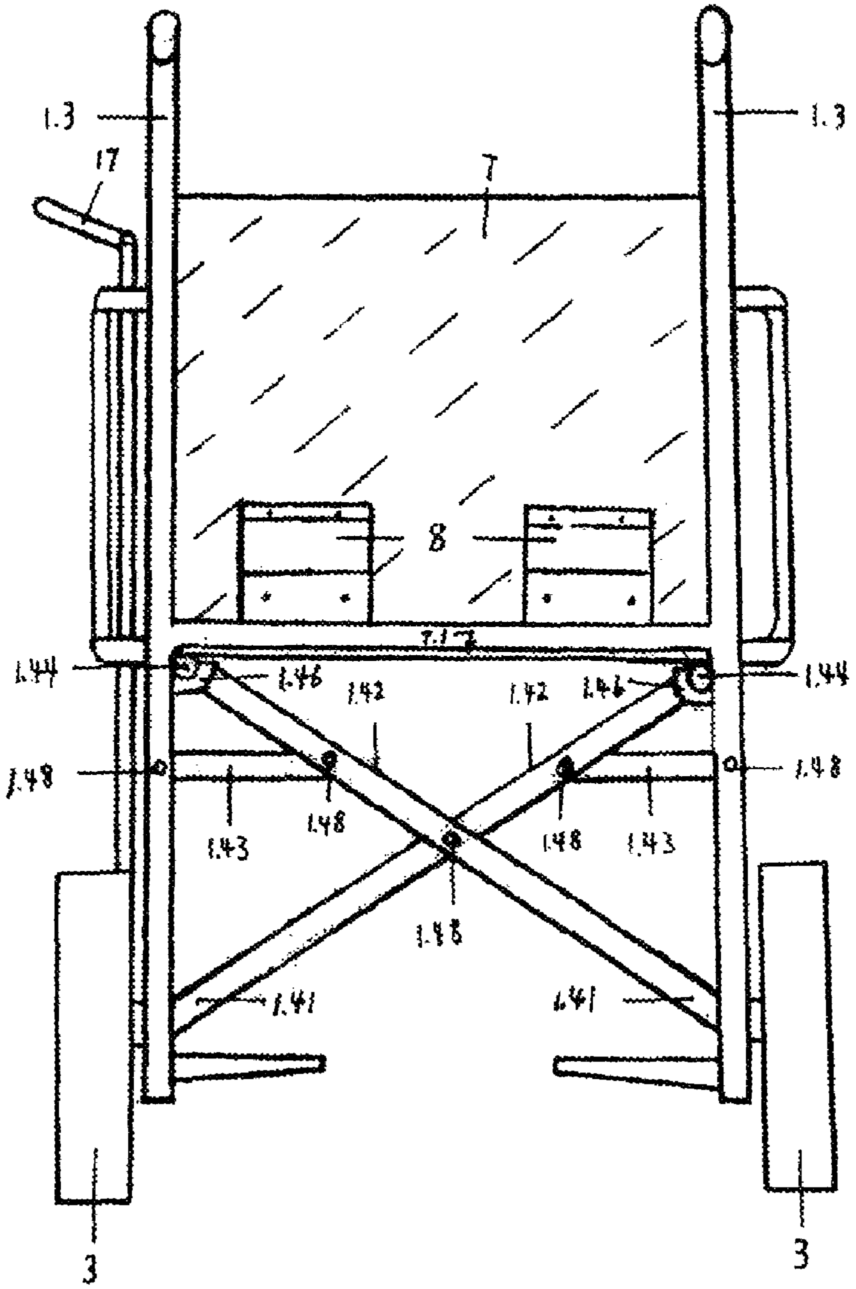
FIG. 5 shows, in the view from back, the cross foldable device of the portable power-saving and foldable electric wheel chair.

There is the cross foldable device (1.41-1.48) in the wheel chair frame 1 (see FIGS. 4 & 5), its base is the two front cross pipes 1.41 and two rear cross boards 1.42, the upper ends of the two front cross pipes 1.41 and two rear cross boards 1.42 are connected by welding to the left and right horizontally supporting pipes 1.44 of the cushion 7.1, the lower ends of the two front cross pipes 1.41 and two rear cross boards 1.42 are connected by welding to two short pipes 1.45, which may rotate around its inner pipe, in addition, there are two cross fold positioning boards 1.43, which make the fold and interaction between the two rear cross boards 1.42 and the left and right main vertical pipes 1.3 keep stable by means of four slip-connecting screws 1.48, there are four inner pipe fixing screws 1.47 out of the two ends of the left and right short pipes 1.45 respectively, the screws tightly fix the inner pipes and non-turning outer pipes, there are totally four hook-shaped supporters 1.46, which are welded at the front and rear of the left and right horizontally supporting pipes 1.2 and at the bottom planes tightly close to the supporting pipes 1.2, and used to support the left and right horizontally supporting pipes 1.44 of the cushion 7.1; all of the parts mentioned above constitute the cross foldable device of the portable power-saving and foldable electric wheel chair.

Two switches 18 (see FIG. 1) for positive or inversion running of the motors are installed on the connecting places between the front of the left armrest pipe 5 and right armrest pipe 6 and the left and right vertical pipes 1.1, those switches coordinate with speed-adjusting turning handle 14 together to control the main running direction of the portable power-saving and foldable electric wheel chair, namely to go forward and backward or to turn left and right in situ.

A safe belt 28 is equipped on the cushion 7 of the chair. Two handbrakes 29 are installed at the left and right lower parts of the main vertical pipe 1.3 of the chair. Two or one control box 8 (to be connected from two to one to install the intellectual control rod 32), which is installed on the back of the cushion 7 of the chair, fixed by nuts.

Band brakes may be installed on the left and right rear wheels to replace the disc brakes when it is practically implemented. One end of the band brake is tightly secured with its own female screw screwing in the male screw on the end-cover of the rear wheel motor 30, another end of the band brake is connected to hand press brake handle 15 via the main steel string 24; the main steel string 24 is connected to the left and right branch steel strings 25 via the delta-shaped conversion plate 26, and draws the two branch steel strings 25 to control the braking rod of the left and right band brakes respectively, to attain the safe effect of two band brakes braking simultaneously by means of a single hand to press the brake handle 15, or by means of a small electric device to draw the main steel string 24.

Figure 6:
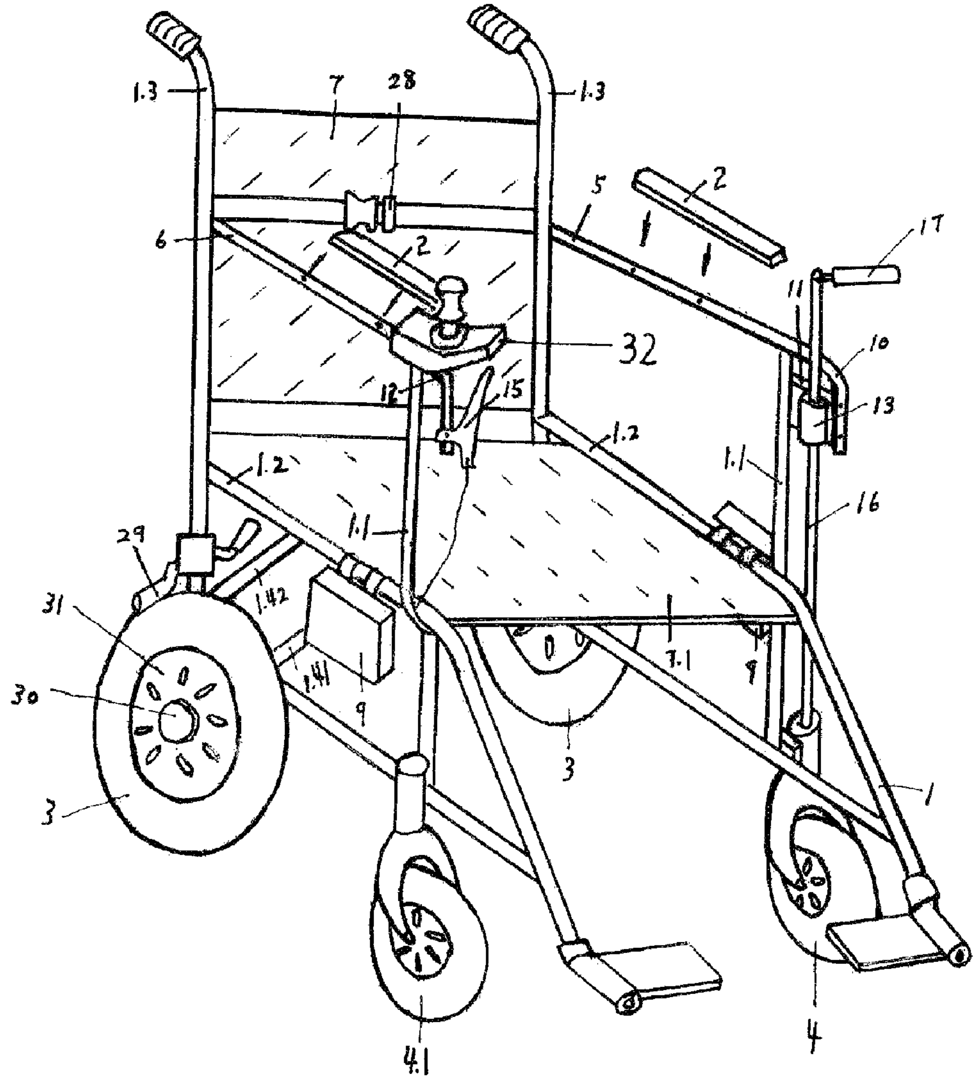
FIG. 6 shows the second schematic drawing of the configuration of the portable power-saving and foldable electric wheel chair (the intellectual control rod 32, instead of the speed-adjust turning handle 14 and two switches 18 for positive or inversion running of the left and right motors, is installed on the right elbow 12, the rests of the configuration remain the same).

The intellectual control rod 32 (see FIG. 6) could be installed on the right elbow 12 to replace the speed-adjusting turning handle 14 and the switches 18 for positive or inversion running when it is practically implemented, the rod 32 will interact with the hand control direction handle 17: The intellectual control rod lays stress on gross adjustment, namely to control the current and the main running direction of electric wheel chair, which goes forward and backward or turns left and right in situ; On the other hand, the hand control direction handle 17 lays stress on fine adjustment, and it accurately controls and adjusts the specific running direction of electric wheel chair. The advantage of installing the intellectual control rod is easy to operate without repeatedly switching two switches 18 for positive or inversion running of the motors, and its shortcoming is to raise the cost and price.

What is claimed is:

1. A portable power-saving and foldable electric wheel chair, comprising a frame of wheel chair (1), two vertical pipes (1.1), two horizontally supporting pipes (1.2), two main vertical pipes (1.3), two rear wheels (3), a front direction wheel (4), a front caster (4.1), a left arm-rest pipe (5), a right arm-rest pipe (6), and two arm-rests (2), the front ends of the left and right arm-rest pipes (5) and (6) are bent as elbows (10, 12), a hand control direction device is installed on the left elbow (10), a speed-adjusting turning handle (14) and a hand press brake handle (15) are installed on the right elbow (12), characterized in that the chair has a power-saving driving unit, motor directly driving rear wheel, and has a power-saving braking unit, manual disc brake, and has a direction control unit; wherein said driving unit comprises: there are two mounting vertical boards (19) of the rear wheels at the lower end of the left and right main vertical pipes (1.3) respectively, the rear wheels (3) with motors (30) are secured on the vertical boards (19) by bolts and nuts, the said motors (30) are DC and brushless motors with stepless adjustable speed, low rotation speed, and high torque, the housings of the motors (30) are integrated with the steel wheel plates (31), with double motors directly driving double rear wheels; wherein said braking unit comprises: disc brakes (20) are installed on the left and right rear wheels, the disc brake includes a disc brake sheet (21), a brake clamp (22) and a brake rod (23), the disc brake sheet (21) is installed by the side of the motor (30) by means of tightly screwing the female screw of the disc brake sheet (21) in the male screw on an end-cover of the motor (30), the brake clamp (22) and the brake rod (23) are fixed on the vertical board (19) via a connecting plate (27) with screws; the hand press brake handle (15) and the disc brakes (20) are connected to a braking steel string via a delta-shaped conversion plate (26), the upper end of the delta-shaped conversion plate (26) is connected to the brake handle (15) via the main steel string (24), the left and right lower ends of a delta-shaped conversion plate (26) are connected to the left and right brake rods (23) via left and right branch steel strings (25) respectively, by means of a single hand to press brake handle (15) or by means of a small electric device to draw the main steel string (24), the brake rods (23) are tightly pulled so that the two brake clamps (22) tightly clip the two brake sheets (21), and the two rear wheels (3) are braked simultaneously, wherein said direction control unit comprises: two switches (18) for positive or inversion running of the motors are installed on the connecting places between the front of the left armrest pipe (5) and right armrest pipe (6) and the left and right vertical pipes (1.1), to control the main running direction of the electric wheel chair—to go forward and backward or to turn left and right in situ; and the hand control direction device includes a fixing plate (11), a hollow bearing (13), a vertical hand control rod (16), a hand control direction handle (17), the vertical hand control rod (16) inserting through the hollow bearing (13), the upper end of the rod is connected to the hand control direction handle (17), the lower end is connected to the front direction wheel (4), the specific running direction of the electric wheel chair can be accurately controlled by means of holding the hand control direction handle (17) with the left hand to control the front direction wheel (4).

2. The portable power-saving and foldable electric wheel chair in accordance with claim 1, is characterized by that there is a cross foldable device in the wheel chair frame (1), its base is two front cross pipes (1.41) and two rear cross boards (1.42), the upper ends of the two front cross pipes (1.41) and two rear cross boards (1.42) are connected to the left and right horizontally supporting pipes (1.44) of the cushion (7.1), the lower ends of the two front cross pipes (1.41) and two rear cross boards (1.42) are connected to the left and right short pipes (1.45), which may rotate around its inner pipe at a small angle; two cross fold positioning boards (1.43) make the fold and interaction between the two rear cross boards (1.42) and the left and right main vertical pipes (1.3) keep stable by means of four slip-connecting screws (1.48), the cross points of the two front cross pipes (1.41) and the two rear cross boards (1.42) are also connected to each other via the slip-connecting screws (1.48), there is an inner pipe fixing screw (1.47) out of the two ends of the left and right short pipes (1.45) respectively, the screws tightly fix the inner pipes and non-turning outer pipes, there are four hook-shaped supporters (1.46) which are connected at the front and rear of the left and right horizontally supporting pipes (1.2) and at the bottom planes tightly close to the supporting pipes (1.2), and used to support the left and right horizontally supporting pipes (1.44) of the cushion (7.1), therefor the electric wheel chair is foldable even with batteries.

* * * * *